(12) United States Patent
Cuadrado Fernandez (10) Patent No.: US 11,413,642 B2
(45) Date of Patent: Aug. 16, 2022

(54) COATING DEVICE WITH MOVABLE SPRAY NOZZLES

(71) Applicant: STE TECPHARM, S.L., Cerdanyola del Valles (ES)

(72) Inventor: Pedro Cuadrado Fernandez, Barcelona (ES)

(73) Assignee: STE TECPHARM, S.L., Cerdanyola del Valles (ES)

( * ) Notice: Subject to any disclaimer, the term of this patent is extended or adjusted under 35 U.S.C. 154(b) by 0 days.

(21) Appl. No.: 17/260,807

(22) PCT Filed: Jun. 19, 2019

(86) PCT No.: PCT/ES2019/070425
§ 371 (c)(1),
(2) Date: Jan. 15, 2021

(87) PCT Pub. No.: WO2020/016465
PCT Pub. Date: Jan. 23, 2020

(65) Prior Publication Data
US 2021/0291219 A1   Sep. 23, 2021

(30) Foreign Application Priority Data

Jul. 18, 2018 (EP) .................................. 18382536

(51) Int. Cl.
*B05B 15/68* (2018.01)
*B05B 15/70* (2018.01)
(Continued)

(52) U.S. Cl.
CPC ............ *B05B 15/68* (2018.02); *A23G 3/0095* (2013.01); *A23G 3/26* (2013.01); *B05B 13/0257* (2013.01); *B05B 15/70* (2018.02)

(58) Field of Classification Search
None
See application file for complete search history.

(56) References Cited

U.S. PATENT DOCUMENTS

| 6,569,462 B1 * | 5/2003 | Cornelli | B01J 2/12 |
| | | | 427/407.1 |
| 2002/0134303 A1 * | 9/2002 | Giogoli | B05B 15/68 |
| | | | 118/19 |
| 2011/0203520 A1 * | 8/2011 | Fusejima | A23P 20/10 |
| | | | 118/500 |

FOREIGN PATENT DOCUMENTS

| EP | 1 200 197 A1 | 5/2002 |
| EP | 2 363 202 A1 | 9/2011 |
| JP | 2003-062500 A | 3/2003 |

OTHER PUBLICATIONS

Engish translation for JP2003062500 (already of record).*
(Continued)

*Primary Examiner* — Charles Capozzi
(74) *Attorney, Agent, or Firm* — Sughrue Mion, PLLC (57) ABSTRACT

The invention relates to a coating device (100) with movable spray nozzles comprising a rotating drum (3) and positioning group (1) of a set of spray nozzles (21) for a product with a control column (5) able to be located essentially axially inside the drum (3) and which houses an inner shaft (6), the control column (5) being equipped with at least an articulated arm (7) that includes a rotating nozzle set (21) carrier (20). A transmission system (30) based on pulley means and corresponding pulling means housed in the control column (5) and in the articulated arm (7) simultaneously produce the contraction or extension of the articulated arm (7) and the rotation of the nozzle set (21) carrier (2) based on the relative angular position between the steering column (5) and the inner shaft (6).

8 Claims, 6 Drawing Sheets

(51) Int. Cl.
*A23G 3/34* (2006.01)
*A23G 3/26* (2006.01)
*B05B 13/02* (2006.01)

(56) References Cited

OTHER PUBLICATIONS

International search report for PCT/ES2019/070425 dated Sep. 26, 2019.
European search report for EP 18 38 2536 dated Jan. 15, 2019.

* cited by examiner

COATING DEVICE WITH MOVABLE SPRAY NOZZLES

CROSS-REFERENCE TO RELATED APPLICATIONS

This application is a National Stage of International Application No. PCT/ES2019/070425 filed Jun. 19, 2019, which claims priority under U.S.C. § 119(a) to European Patent Application No. EP18382536.3 filed on 18 Jul. 2018.

TECHNICAL FIELD OF THE INVENTION

The present invention relates to a coating device of the type that comprises a rotating drum intended to stir a mass of articles to be coated with a specific product by means of the spraying of said product through nozzles placed inside the drum. These devices, for example, are used for coating granular articles, such as pharmaceutical products or confectionary products.

BACKGROUND OF THE INVENTION

Coating devices are widely used in the pharmaceutical sector for applying an outer layer of one or several products to granular articles or articles in the form of capsules.

These devices essentially comprise a container inside of which a drum containing the mass of articles to be coated spins. The devices are generally equipped with a series of spray nozzles for the product to be used to coat the articles. This spray operation is carried out while the drum spins and stirs the mass of articles to ensure a homogenous coating of the articles. Also, in a conventional way, the drum is perforated and the coating device comprises a forced air circuit that passes through the drum and helps dry the sprayed product once it has been applied to the articles to be coated.

It turns out that the distance between the nozzles and the free surface of the articles to be coated is a key factor for ensuring proper coating. This distance is not, however, the only parameter that is involved in achieving an optimum coating. Other factors, such as the direction of the beam of the sprayed product, play an important role, being especially important to aim the beam in a direction that is essentially normal to the free surface of the mass of articles to be coated.

The devices with fixed nozzles cannot be adapted to these requirements and therefore can only be properly used for batches of very specific articles.

For example, the smaller the batch of articles to be coated, the greater the distance between the free surface of said stirred articles inside the drum and the spray nozzles will be, preventing devices with fixed nozzles, essentially apt for large batches, from being used for smaller batches and vice versa.

Likewise, it may be the case that, for a single batch of articles, different distances between the free surface of the same and the nozzles are required, if, for example, the properties of the product used to coat the articles change.

Likewise, another parameter that affects the performance of devices with fixed nozzles, apart from the distance between the nozzles and the free surface of the product, is the orientation of said nozzles. A change in the volume of the batch varies the natural placement of the mass of articles within the drum during the rotation of the same and, as a result, not only does the distance of the free surface of said mass of articles vary, but also the orientation of the free surface of the same. Therefore, the orientation of the nozzles will have to be adjusted according to the new orientation of the free surface of the mass of articles inside the drum.

Other parameters that also contribute to optimizing coating to the maximum can be the rotation speed of the drum, the exchange of the same, etc., essentially any parameter that can trigger a variation in the distance and/or orientation of the free surface of the mass of articles with respect to a fixed spraying point.

A first objective of the present invention is a coating device with movable spraying nozzles, capable of assuming different spatial positions and also of varying the orientation thereof to adapt to the batch of articles and/or to the product to be used for the coating of the same.

One obstacle to be overcome when designing suitable positioning groups for moving the nozzles inside the drum is that the actuation of the same should preferably be done from the outside of the container that houses the drum. This means that the transmissions between the actuators outside the container and the movable support of the nozzles must pass through the walls of the container, for which a part of the cover of the container is generally used, which can be moved to uncover or close an access opening that is used to be able to introduce the articles inside the drum. This is a delicate part of the device that must not compromise the seal of the container. Therefore, complex sealing closures must be avoided, for example sliders with movable parts that slide on rails or grooves.

Patent document JP2003062500 describes a coating device that includes a positioning group of a series of nozzles. This positioning group only has one degree of freedom, only able to move the nozzles vertically so as to move them close to or move them away from the bottom of the drum. In addition to the fact that this positioning group is not prepared to move the nozzles in other directions, it is also not prepared to orient the nozzles according to the orientation of the free surface of the mass of articles inside the drum.

Patent document EP1200197 describes an alternative to the previously described device in which an articulated arm is rotationally coupled to a fixed support of a tube introduced in the drum. One free end of this arm equipped with the nozzles is joined in a movable way along an integral guide of a rotating shaft. By actuating the rotation of this shaft, the guide can be rotated in one direction or another to retract or extend the articulated arm and at the same time essentially maintain the same orientation of the nozzles. In practice, it is possible to move the nozzles close to or away from the wall of the drum without varying the orientation of the nozzles too much. Although this proposal improves the solution described in JP2003062500 in some aspects, it is still not possible to provide the nozzles with the minimum degrees of freedom that would be desirable in order for the device to be versatile, because in all of the possible placements thereof the nozzles will have the same orientation when, as was previously explained, the orientation of the free surface of the articles can vary according to the nature and volume thereof, rotational speed of the drum, etc., as a result varying the optimal orientation of the nozzles in each case.

DESCRIPTION OF THE INVENTION

The device proposed overcomes the aforementioned drawbacks. The device comprises, in a way in itself known, a coating container that houses a rotating and perforated drum intended to stir a mass of articles to be coated during the rotation of the drum, which will define a free surface, and a positioning group of a set of spray nozzles for a product with which one desires to coat the articles while they are stirred by the drum.

In essence, the device is characterized in that said positioning group comprises a control column, able to be located essentially axially inside the drum, which houses an inner shaft, the control column being equipped with at least an articulated arm that has a first part and a second part articulated together around a first shaft, the first part rotating in conjunction with the control column, and a nozzle set carrier being joined in an articulated way around a second shaft to the second part of the articulated arm, both first and second shafts parallel to each other and to the control column.

The positioning group also comprises a transmission system based on pulley means and corresponding pulling means in the control column and in the articulated arm which simultaneously produce the contraction or extension of the articulated arm and the rotation of the nozzle set carrier with respect to the second part of said articulated arm based on the relative angular position between the control column and the inner shaft; the positioning group further comprising a first actuator and a second actuator for actuating, from outside of the container, the rotation of the control column and the rotation of the inner shaft, respectively, and thereby conveniently varying the angular position thereof and, by means of doing so, the degree of extension of the articulated arm and the orientation of the nozzle set carrier.

Advantageously, the positioning in the space and the orientation of the nozzle set can be achieved by means of the rotation of the control column and of the inner shaft thereof, this action being very easy to do from the outside of the container.

Likewise, the positioning group avoids the use of mechanisms that produce linear movements, such as telescopic arms, screws or similar inside the drum that usually involve the insertion and extraction of elements into and out of others, taking the risk of having particles being located inside the same and not being eliminated during the cleaning operations, causing undesirable cross contamination in the field of the preparation of pharmaceutical products.

This risk does not exist in the device of the present invention because the linear movement of the nozzles is the result of the combination of rotational movements, which can easily be protected with valid seals, for example in the pharmaceutical sector.

In an embodiment, the transmission system comprises first pulley means, fixed or integral to the inner shaft, second pulley means, freely rotating around the second shaft and fixed or integral to the nozzle set carrier; third pulley means, freely rotating around the first shaft and connected to the first pulley means by means of first pulling means; and fourth pulley means, fixed or integral to the first part of the articulated arm and connected to the second pulley means by means of second pulling means, all of which is configured so that one turn of the first and second pulley means respectively correspond to more than one turn of the third and fourth pulley means.

The transmission system is passive or driven, in the sense that it is activated by a change in the relative position between the control column and the inner shaft thereof.

There is preferably a multiplying or reducing relationship between the first and third pulley means, and between the second and fourth pulley means. In an embodiment of interest, the pulley means are configured such that one turn of the first and second pulley means respectively corresponds to two turns of the third and fourth pulley means.

According to a variant of the invention, the control column is equipped with two articulated arms such that the nozzle set carrier is joined in an articulated way and extends between the respective second parts of said articulated arms.

The nozzle set carrier can comprise a collection tube or distributor for the product to be sprayed, preferably axially aligned with the second joining shaft articulated between said carrier and the second part or each second part of the articulated arm or arms to which it is joined in an articulated way. This way, the momentum of force needed to activate the rotation thereof is reduced.

The positioning group comprises means for supplying the nozzles with the product to be sprayed which preferably comprise a hydraulic connection circuit between the outside of the container and the nozzles through the control column, and thus more sealed closures between the container in that part of access to the drum are no longer needed.

In an embodiment, the hydraulic connection circuit is partially housed inside the third articulated joining arm between the control column and the nozzle set carrier.

To facilitate the interchangeability of the nozzles, to modify the number or distribution thereof, it is envisaged that the nozzles are coupled in a removable way to a guide member that extends parallel to the second joining shaft between the nozzle set and the at least one articulated arm.

DETAILED DESCRIPTION OF AN EMBODIMENT

Figure 1:
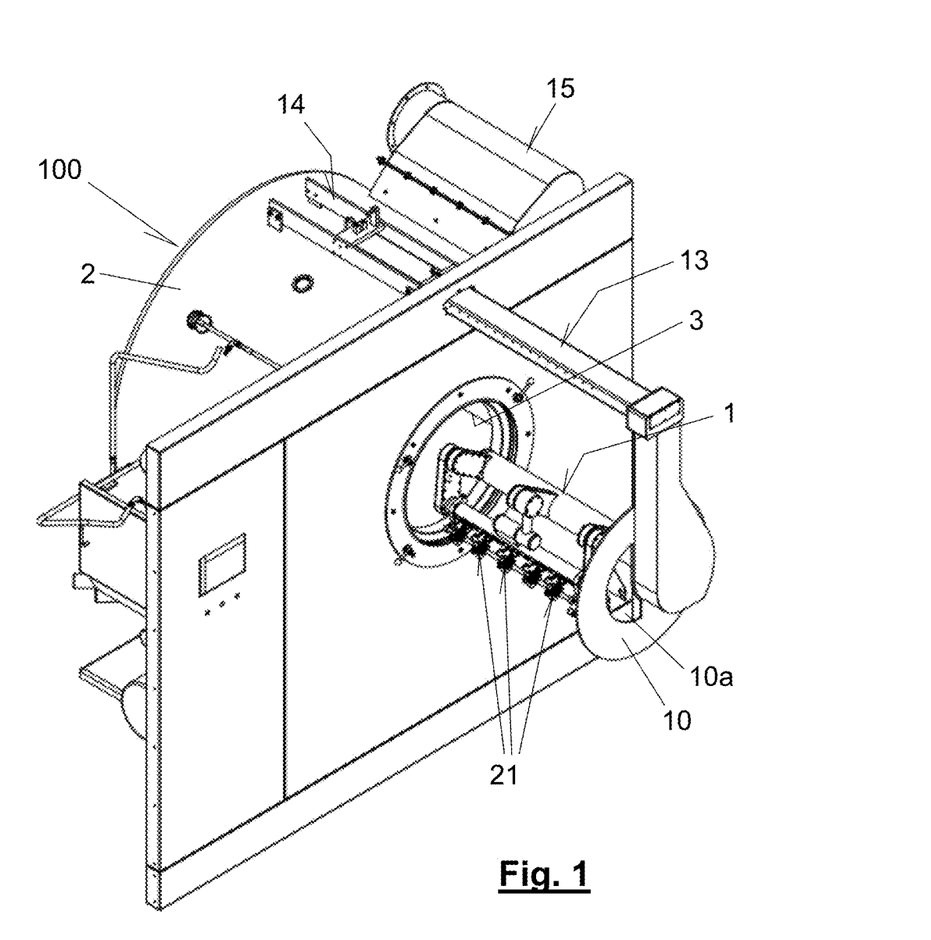
FIG. 1 is a general view of a device according to the invention.

FIG. 1 shows a device 100 that exemplifies the invention. The device 100 comprises in a known way a container 2 that houses a rotating drum 3 inside of which the articles to be coated are arranged. Although it is not shown in the figures, the drum 3 is a perforated drum and can have a series of flaps for stirring the articles in the proper way during the rotation of the drum 3.

The device 100 is equipped with a nozzle set 21 for spraying the product that must coat the articles. The work cycle of the device 100 comprises a stage during which the nozzles 21 are introduced in the drum 3 while the same spins and stirs the articles to be coated, such that the product sprayed by the nozzles 21 is applied to the surface of said articles. The rotation of the drum 3 and the correct placement of the nozzles 21 helps make the application of the product to the surface of the articles homogenous.

The drum 3 is open at one of the bases thereof through which the articles to be coated are introduced and through which the coated articles are extracted once the work cycle of the device 100 has finished. In a conventional way, the device 100 of FIG. 1 comprises a cover 10, provided with a peephole 10a, for uncovering or closing the opening of the drum 3. In the example of FIG. 1, in order to facilitate the handling thereof, this cover 10 is not hinged to the body of the container 2 but is rather a removable cover of the container 2 according to an axial direction in relation to the drum 3 and which is suspended from a guide system 14 and slider 13, suitable for supporting the weight of the cover 10 and, in the present case, also that of a positioning group 1 of the nozzle set 21, the function of which is to be able to arrange and orient said nozzles 21 in an optimum way according to the work to be done, as will be explained in further detail below.

Figure 2:
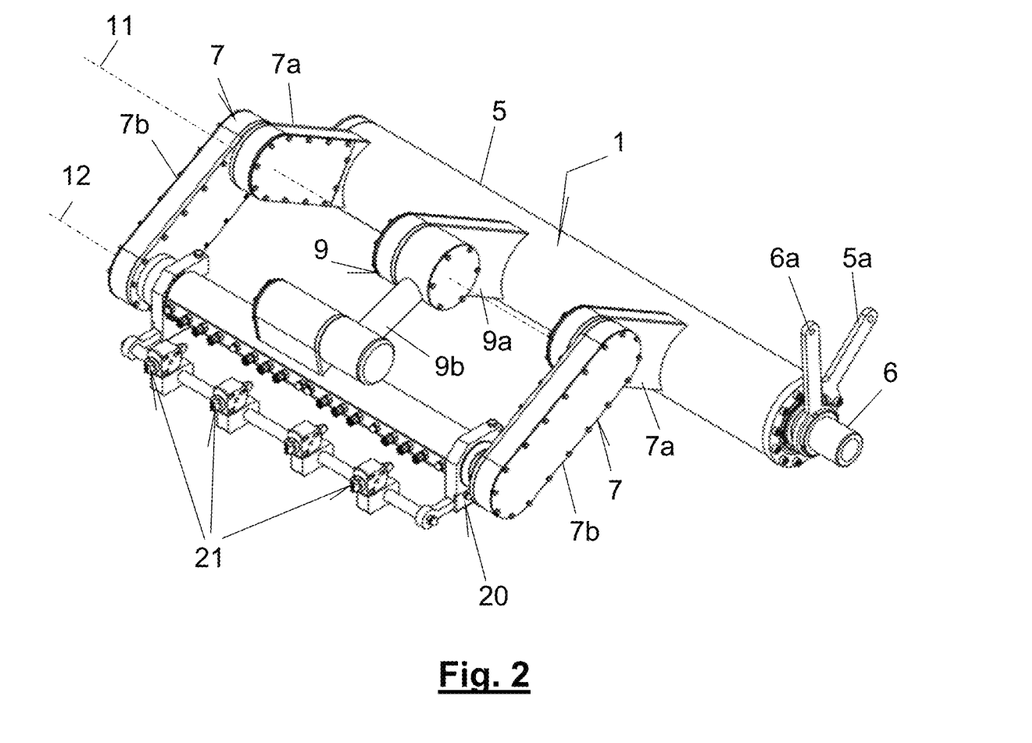
FIG. 2 shows a perspective view of the positioning group of the device according to FIG. 1.

FIG. 2 illustrates the previously mentioned positioning group 1. This positioning group comprises a control column 5 that is placed essentially axially on the inside of the drum 3 when the cover 10 is placed in a way so that it closes the container 2, and which is equipped with first and second articulated arms 7 between which a nozzle 21 carrier 20 extends, and with a third articulated arm 9, which is central, of service, and suitable for housing all of the services needed by the nozzles 21 for controlling the same. Specifically, each articulated arm 7 has a first part 7a and a second part 7b articulated together around a first shaft 11, the first parts 7a being integral to the control column 5 and a nozzle set 21 carrier 20 being joined in an articulated way around a second shaft 12 to the second parts 7b of the articulated arms 7, both first and second shafts 11, 12 parallel to each other and to the control column 5.

In accordance with these articulated joints, the third service arm 9 further comprises first and second parts 9a and 9b articulated around a rotational shaft aligned with the first shaft 11. Likewise, the second part 9b of the third arm 9 is mechanically connected, with a gap or certain play, to the nozzle 21 carrier 20. In this connection with some freedom of movement, components with flexible properties, external protective covers, telescopic connections, etc. can intervene.

The aforementioned carrier 20 of the nozzles 21 is articulated to the articulated arms 7 and said articulated arms 7 have the ability to fold and extend, at the same time being able to rotate when the control column 5 is made to rotate. These characteristics provide enough degrees of freedom to the positioning group to arrange the nozzles 21 in the optimum place inside the drum 3 and also with an optimum orientation, according to the work needs.

To such effect, the control column 5 is a rotatable control column which is able to rotate around the longitudinal axis thereof and houses an inner coaxial shaft 6, which is also rotatable independently from the control column 5; and the positioning group further comprises a transmission system 30, which we will comment on in further detail below with the help of FIGS. 3 and 4, which, based on pulley means and corresponding pulling means housed in the control column 5 and in the articulated arms 7 produce the folding or extension of the articulated arms 7 by varying the relative angular position between the steering column 5 and the inner shaft 6. Advantageously, this transmission system 30 further ensures that the nozzle 21 carrier 20 corrects its orientation, so that the same does not vary when the articulated arms fold or extend.

Figure 3:
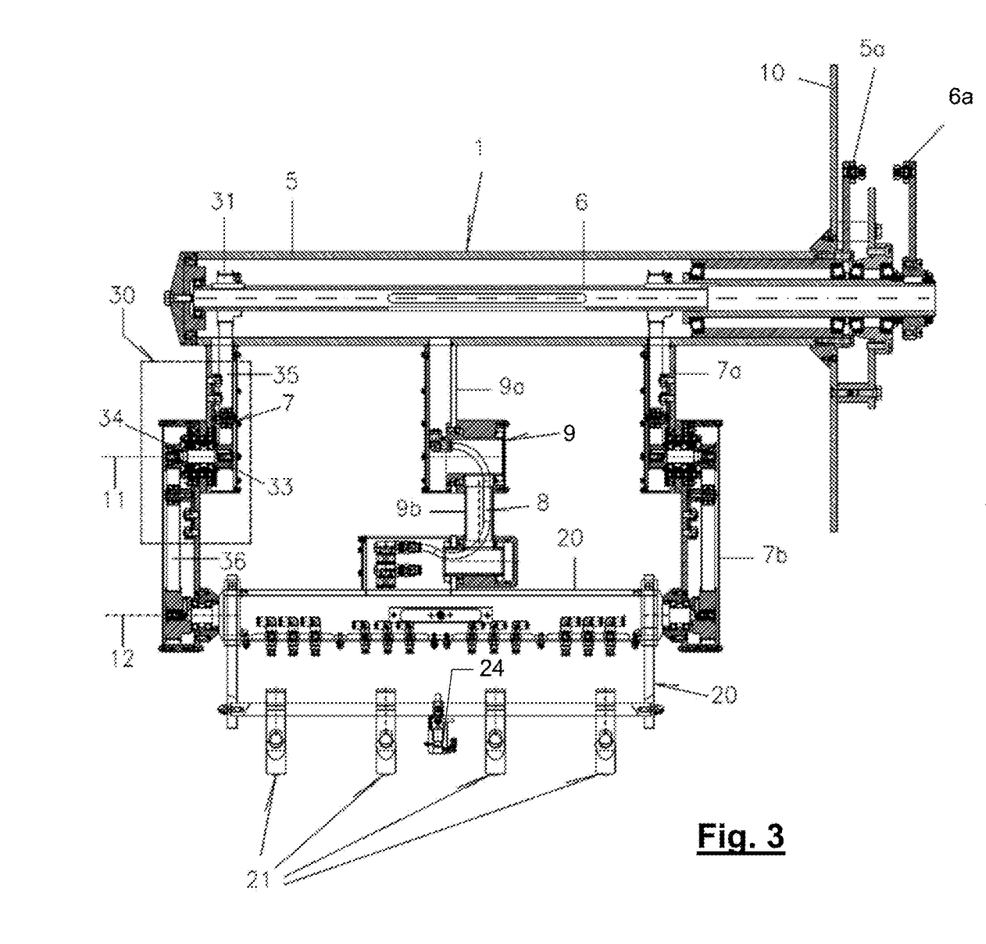
FIG. 3 is a cross-sectional view of the positioning group of FIG. 2.
Figure 4:
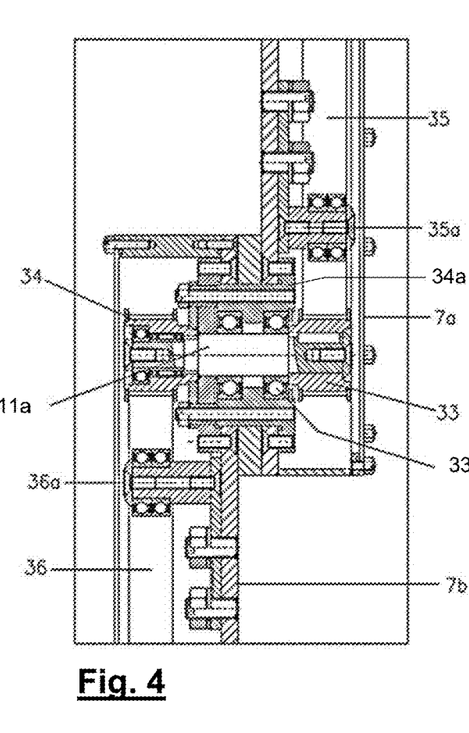
FIG. 4 is a view of the detail of FIG. 3 of the part marked with a dashed line.

As shown by FIGS. 3 and 4, for each articulated arm 7, the transmission mechanism 30 comprises first pulley means 31, joined to the inner shaft 6 and around which the first part 7a of the articulated arm 7 rotates when the control column 5 spins with respect to the inner shaft 6; and third pulley means 33 freely rotating around the first shaft 11, placed at the free end of the first part 7a of the articulated arm 7, firmly coupled to a rotating shaft 11a driven by third pulley means 33 and to which the second part 7b of the articulated arm 7 is firmly joined, the first and third pulley means 31 and 33 being related to each other by means of first pulling means 35.

For each articulated arm 7, the transmission mechanism 30 further comprises fourth pulley means 34, coaxial to the third pulley means 33 but firmly joined to the first part 7a of the articulated arm around which the second part 7b of the articulated arm 7 rotates when the rotational shaft 11a spins together with the third pulley means 33; and second pulley means 32 freely rotating around the second shaft 12, placed at the free end of the second part 7b of the articulated arm 7, firmly coupled to the nozzle 21 carrier 20, the fourth and second pulley means 34 and 32 being related to each other by means of second pulling means 36.

In the embodiment of the example, the pulley means are configured such that one turn of the first and second pulley means 31, 32 corresponds to two turns of the third and fourth pulley means 33, 34.

Likewise, to guarantee the tension of the first and second pulling means 35 and 36 and increase the contact arc of the first and second pulling means with the third and fourth pulley means 33 and 34, it is envisaged that respective groups of deviation wheels 35a and 36a are, respectively, placed adjustably in position.

In the embodiment that exemplifies the invention, the transmission system has cogwheels as first, second, third and fourth pulley means 31 to 34 and toothed or synchronous belts as first and second pulling means 35 and 36. Alternatively, chains can be used instead of toothed belts and pinion wheels and generally any type of pulley means and pulling means able to transmit pulling forces. In this sense, as long as there is mechanical interference or enough friction between the pulley means and the pulling means, said transmission can take place. Also envisaged is the use of cables or bands and wheels with or without a channel on the periphery thereof without altering the essence of the invention.

The components of the transmission means 30 are completely housed inside the positioning group 1, protected from the environment inside the drum 3. In the example, the first pulling means 35 run inside the first part 7a of the articulated arms 7; and the second pulling means 36 run inside the second part 7b of the articulated arms 7.

Figure 4A:
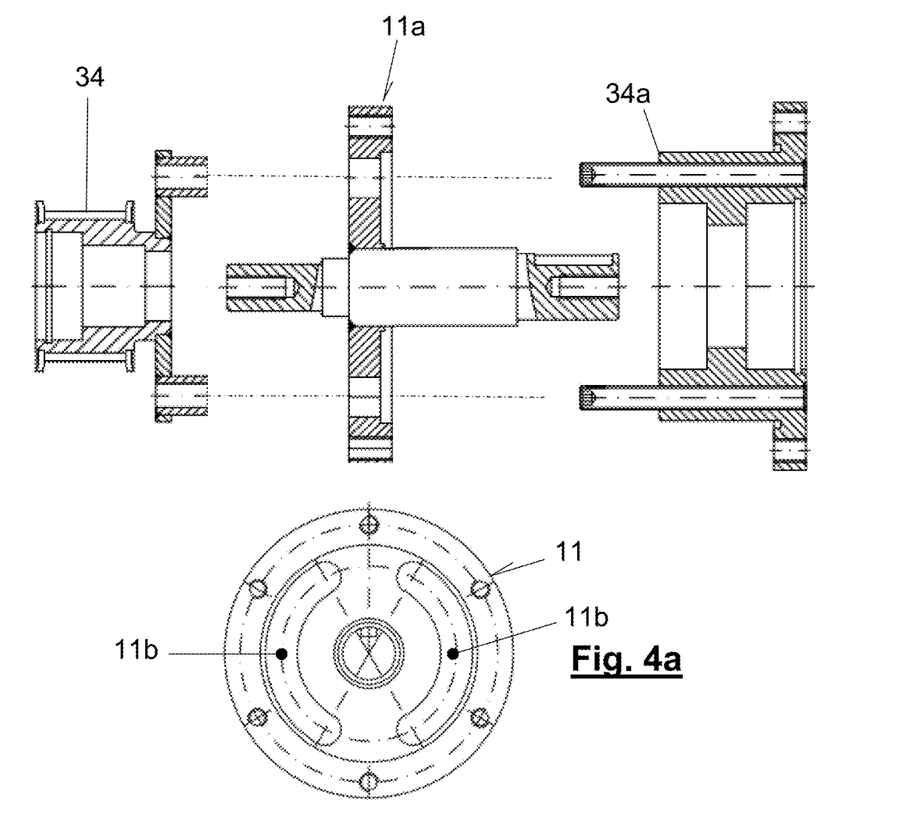
FIG. 4a is a view of the main components and in a correlative fitting position for transmitting rotation from the third pulley means to the second part of the articulated arm and in turn fixing the fourth pulley means to the first part of the articulated arm.

The articulated junction between said first and second parts 7a and 7b of the articulated arms 7 are shown in the enlargement of the detail of FIG. 4 and the main components thereof are represented in FIG. 4a in a correlative fitting position. As one of the possible mechanical alternatives, in the present example it is provided the rotational shaft 11a with a ring with two guide slots 11b in a circumferential arc and concentric with respect to the center thereof through which relative movement will be made possible between the second part 7b of the articulated arm 7, fixed with respect to said rotating shaft 11a, and third pulley means 34 fixed to the hub 34a (through the guide slots 11a) joined to the first part 7a of the articulated arm 7 and mounted about the rotational shaft 11a, related to the same by means of a set of bearings 33a that make the rotational movement possible between the set formed by the rotational shaft 11a and the second part 7b of the articulated arm 7 with respect to the assembly formed by the third pulley means 33 and the hub 34a, fixed to the first part 7a of the aforementioned articulated arm 7 by a set of bolts that have a sufficient length.

Thus, the relative position between the control column 5 and the inner shaft 6 will determine the degree of extension of the articulated arms 7; and the absolute position of the control column 5 and the inner shaft 6 will determine the orientation of the nozzles 21. To take advantage of this, the device 100 comprises actuators to rotate the control column 5 and the inner shaft 6 in an individual way by means of actuating the levers 5a and 6a, respectively, actuated for example by respective motorized screw-type actuation with brushless-type motors.

The operational principle of the positioning group 1 is explained below with the help of FIGS. 5a to 5c and 6a and 6b.

A) Changing the Orientation of the Nozzles with Respect to the Bed of Articles to be Coated.

The change in the orientation is necessary because if the amount of articles is altered, the orientation of the free surface thereof inside the drum changes, and as a result, the ideal orientation of the spray beam changes.

Figure 6A:
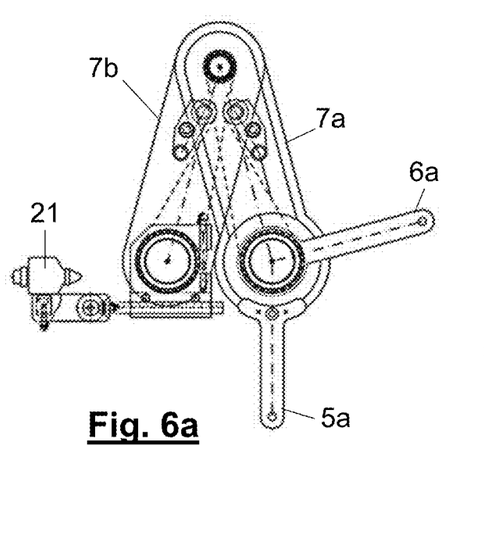
FIGS. 6a and 6b show a sequence of movements that illustrate the functioning of the transmission system of the positioning group when the control column and the inner shaft are rotated together.
Figure 6B:
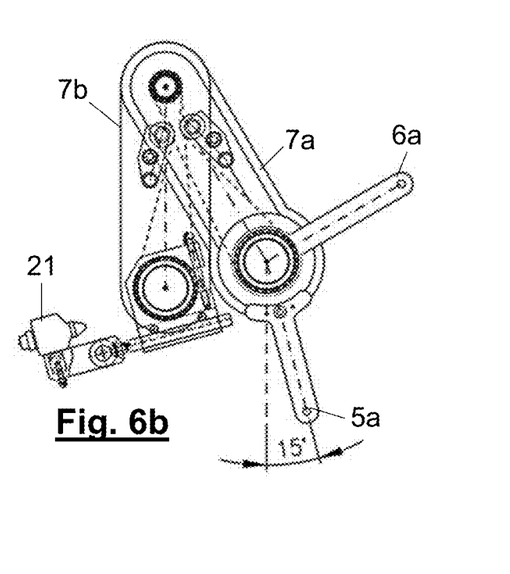

As shown in the sequence of FIGS. 6a and 6b, if the motorized actuators of the levers 5a and 6a, whether simultaneous or not, produce the same amount of rotation and in the same direction of the control column 5 and of the inner shaft 6, the relative position thereof will not vary. The control column 5 and the inner shaft 6 will have changed their position with respect to the same absolute reference, causing the rotation of the articulated arms 7 but without changing their degree of extension. This rotation produces the change in the orientation of the nozzles 21.

This movement A) is represented in FIGS. 6a and 6b, which show a rotation of 15° in a counterclockwise direction both of the lever 5a and of the lever 6a, for actuating the control column 5 and the inner shaft 6, respectively. This rotation produces a 15° rotation of the spray nozzles 21 also in a counterclockwise direction.

B) Changing the Degree of the Extension of the Articulated Arms.

The change in the degree of extension of the articulated arms is also necessary because by altering the amount of articles, the same will move away from or close to the free surface of the bed of articles with respect to the center of the drum, the position of the nozzles needing to be corrected to arrange them at the ideal distance from the articles. The degree of extension of the articulated arms will allow the spray nozzles to move close to or move away from the articles.

Figure 5A:
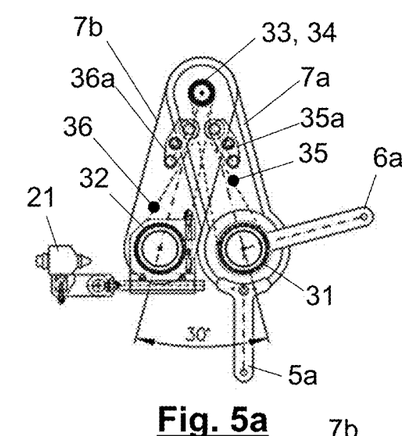
FIGS. 5a, 5b and 5c show a sequence of movements that represent the functioning of the transmission system of the positioning group when the relative angular position between the control column and the inner shaft is varied.
Figure 5B:
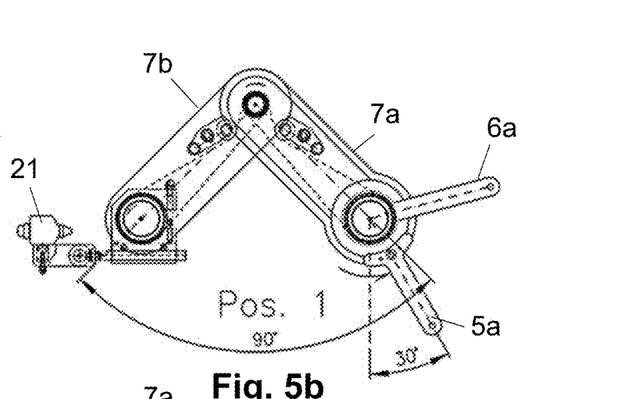
Figure 5C:
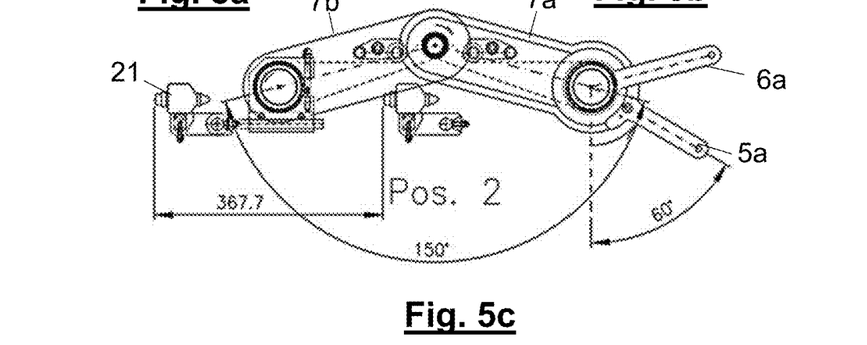

As shown in the sequence of FIGS. 5a to 5c, if the motorized actuators of the levers 5a and 6a, whether simultaneous or not, produce a variation in the relative position thereof, the control column 5 and the inner shaft 6 will also vary their relative position, producing a change in the degree of extension of the articulated arms 7.

This movement B) is represented in FIGS. 5a and 5c, which show a rotation of 30° in a counterclockwise direction of the lever 5a, keeping the lever 6a immobile, then causing the rotation of the control column 5, keeping inner shaft 6 static.

In this case the first pulley means 31 will be kept static and the first part 7a of the articulated arms will rotate around them the same amount as the lever 5a.

On the one hand, the movement of the first part 7a of the articulated arms 7 makes the first pulling means 35 pull the third pulley means 33 which, in turn, through the rotational shaft 11a, pull the second part 7b of the articulated arms 7 such that by rotating the first part 7a in a counterclockwise direction a specific angle "a", the third pulley means 33 controlled by the first pulley means 31 will make the second part 7b of the articulated arms 7 rotate in a clockwise direction and in relation to the first part 7a, an angle "2a".

In the example, a variation of 60° in the relative position between the levers 5a and 6a cause a variation of 120° in the angle formed between the first and the second parts 7a and 7b of the articulated arms 7, said angle initially being 30° and ending up being 150°.

On the other hand, the same phenomenon occurs between the carrier 20 of the nozzles 21 and the second part 7b of the articulated arms.

The fourth pulley means 34, which are joined to the first part 7a of the articulated arms, pull, by means of the second pulling means 36, and by the effect of the rotation of the second part 7b of the articulated arm 7 around the aforementioned third pulley means 33, the second pulley means 32, but since their relationship is from 1 to 2, they will make the second pulley means 32 rotate an angle of an absolute value "a" in a clockwise direction with respect to the first part 7a of the articulated arms 7, but since the same has rotated the same angle "a" in a counterclockwise direction, meaning in the opposite direction, the result is that the second pulley means 32 keep their original orientation.

Playing with these principles A) and B) the device 100 is prepared to, based on the needs of each batch of articles to be coated, arrange and orient the nozzles 21 in an ideal way.

Naturally, it can proceed to maneuver the control column 5 and the inner shaft 6 according to the principle A) and then according to the principle B) if it is necessary to change the orientation as well as moving the nozzles 21 away from or close to the bed of articles; it can also proceed in the opposite order and maneuver the control column 5 and the inner shaft 6, first according to principle B) and then according to principle A); or it can proceed to maneuver the control column 5 and the inner shaft 6 according to both principles simultaneously, knowing beforehand the final or absolute angular position of the control column 5 and the inner shaft 6 that will arrange the nozzles 21 in the ideal space position and orientation.

Evidently, the angular positions and/or the maneuvers for reaching said positions can be carried out in an automated way, being factory pre-programmed in a control unit or programmed and stored in said control unit, not shown, by the user based on his or her experience.

Figure 7A:
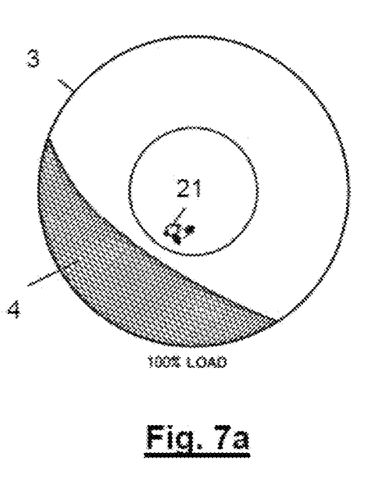
FIGS. 7a and 7b are schematic figures that show two different positions that the nozzle set can take in a device according to the invention, adapting to the requirement of two different masses of articles to be coated.
Figure 7B:
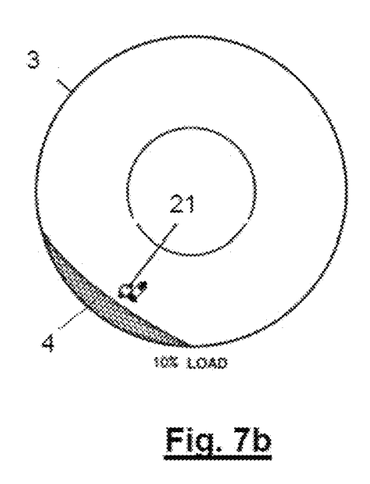

FIGS. 7a and 7b aim to show a change both in the position as well as the orientation of the nozzles 21, which is possible by means of a device 100 according to the invention. Said FIGS. 7a and 7b show the form that a bed of articles 4 takes inside the drum 3 based on the amount of articles, meaning for batches of different volume. The free surface of the articles varies in orientation and also in distance with respect to the center of the drum 3 and in each case the nozzles 21 are arranged in the ideal orientation (essentially normal to the free surface of the bed) and at the appropriate distance.

This allows, for example, a device 100 according to the invention to be sufficiently versatile to work with a very high variability in work batches, the device being efficient when batches that represent 100% of the capacity of the device 100 are used, as well as with batches that only represent 10% of the capacity of the device 100, this proportion being precisely that which is illustrated in FIGS. 7a and 7b.

In the device of the example 100, for supplying the nozzles 21, the positioning group 1 is provided with supply means that comprise a hydraulic connection circuit 8 between the outside of the container 2 and the nozzles 21 through the control column 5 and in this case through the third articulated arm 9, as schematically shown by FIG. 3. For such effect, flexible hoses can be used, which can instantaneously be adapted to the form of this third articulated arm 9. In this case, the hydraulic connection circuit will connect a source of the product to be used, arranged outside of the drum 3, to a collector or distributor 22 of the product to be sprayed, axially aligned with the second articulated joining shaft 12 between the nozzle set 21 carrier 20 and each second part 7b of the two articulated arms 7.

With the aim of increasing the versatility of the device 100, in this case the nozzles 21 are coupled in a removable way to the guide member 23 that extends parallel to the aforementioned second shaft 12, such that they are easily interchangeable and furthermore it is easy to increase or decrease the number thereof, as well as for changing the distribution thereof throughout the guide member 23. The final connection between the nozzles 21 and the collector or distributor 22 can be carried out, in a known way, by flexible tubes or hoses (not shown in the drawings).

The nozzle set 21 carrier 20 can also support a sensor 24 (see FIG. 3) of the ultrasound type able to instantaneously measure the distance to the bed of articles inside the drum 3 during the operation of the device 100. This way, a device 100 is provided with means for automatically correcting the real distance between the nozzles 21 and the bed of articles 4, adjusting it to the objective value determined by the user or which has been selected by the program.

The invention claimed is:

1. A coating device with movable spray nozzles that comprises a coating container that houses a rotating and perforated drum for stirring a mass of articles to be coated during the rotation of the drum, which define a free surface, and a positioning group of a set of spray nozzles for a product to coat the articles while the articles are stirred by the drum characterized in that said positioning group comprises
    a control column, able to be located axially inside the drum, and which houses an inner shaft,
    the control column being equipped with at least one articulated arm which has a first part and a second part articulated together around a first shaft, the first part rotating in conjunction with the control column and a nozzle set carrier being joined by an articulated connection around a second shaft to the second part of the at least one articulated arm, both the first and second shafts parallel to each other and to the control column,
    a transmission system based on pulley means and corresponding pulling means housed in the control column and in the at least one articulated arm which simultaneously produce contraction or extension of the at least one articulated arm and the rotation of the nozzle set carrier with respect to the second part of the at least one articulated arm based on a relative angular position between the control column and the inner shaft; the positioning group further comprising
    a first actuator and a second actuator to actuate, from outside the container, the rotation of the control column and of the inner shaft, respectively, to thereby vary the angular position with a degree of extension of the at least one articulated arm and an orientation of the nozzle set carrier.

2. The device according to claim 1, characterized in that said transmission system comprises
    first pulley means fixed or integral to the inner shaft;
    second pulley means, freely rotating around the second shaft and fixed or integral to the carrier of the nozzle set;
    third pulley means, freely rotating around the first shaft and connected to the first pulley means by means of first pulling means;
    fourth pulley means, fixed or integral to the first part of the at least one articulated arm and connected to the second pulley means by means of second pulling means;
    the pulley means being configured such that one turn of the first and second pulley means respectively corresponds to more than one turn of the third and fourth pulley means or wherein one turn of the third and fourth pulley means respectively corresponds to more than one turn of the first and second pulley means.

3. The device according to claim 2, characterized in that the pulley means are configured such that one turn of the first and second pulley means respectively corresponds to two turns of the third and fourth pulley means.

4. The device according to claim 1, characterized in that the control column is equipped with two articulated arms such that the nozzle set carrier is joined so that the nozzle set carrier is articulated and extends between respective second parts of said articulated arms.

5. The device according to claim 1, characterized in that the nozzle set carrier comprises a collector tube or distributor of the product to be sprayed, axially aligned with the second shaft between the nozzle set carrier and the second part, or each second part of the at least one articulated arm.

6. The device according to claim 1, characterized in that the positioning group comprises means for supplying the nozzles with the product to be sprayed that comprise a hydraulic connection circuit between the outside of the container and the nozzles through the control column.

7. The device according to claim 6, characterized in that the hydraulic connection circuit is partially housed inside a separate articulated arm between the control column and the nozzle set carrier.

8. The device according to claim 1, characterized in that the nozzles are removably coupled way to a guide member that extends parallel to the second joining shaft between the nozzle set carrier and the at least one articulated arm.

* * * * *